United States Patent
Farrell, Jr.

(10) Patent No.: US 12,208,325 B1
(45) Date of Patent: *Jan. 28, 2025

(54) METHOD AND SYSTEM FOR COMPETITIVE VIDEO GAME PLAYING

(71) Applicant: GTG Technologies, LLC, Sugar Land, TX (US)

(72) Inventor: Timothy James Farrell, Jr., Hanson, MA (US)

(73) Assignee: GTG Technologies, LLC, Sugar Land, TX (US)

( * ) Notice: Subject to any disclaimer, the term of this patent is extended or adjusted under 35 U.S.C. 154(b) by 733 days.

This patent is subject to a terminal disclaimer.

(21) Appl. No.: 17/317,293

(22) Filed: May 11, 2021

Related U.S. Application Data (63) Continuation-in-part of application No. 16/788,849, filed on Feb. 12, 2020, now Pat. No. 11,014,006.

(51) Int. Cl.
*A63F 13/35* (2014.01)
*A63F 13/795* (2014.01)

(52) U.S. Cl.
CPC ............ *A63F 13/35* (2014.09); *A63F 13/795* (2014.09)

(58) Field of Classification Search
CPC ................................ A63F 13/35; A63F 13/795
See application file for complete search history.

(56) References Cited

U.S. PATENT DOCUMENTS

| | | | |
|---|---|---|---|
| 10,424,160 B2 * | 9/2019 | Denham | G07F 17/3244 |
| 2007/0077994 A1 * | 4/2007 | Betteridge | G07F 17/32 463/42 |
| 2013/0331191 A1 * | 12/2013 | Puryear | A63F 13/35 463/42 |
| 2016/0203614 A1 * | 7/2016 | Wang | G06V 10/147 382/103 |
| 2017/0076553 A1 | 3/2017 | Washington et al. | |
| 2018/0322732 A1 | 11/2018 | Pachnis et al. | |
| 2019/0192978 A1 * | 6/2019 | Eatedali | A63F 13/79 |

FOREIGN PATENT DOCUMENTS

JP 2002248272 A * 9/2002

* cited by examiner

*Primary Examiner* — Ronald Laneau
(74) *Attorney, Agent, or Firm* — Lanier Ford Shaver & Payne, PC; Gerald M. Walsh (57) ABSTRACT

A method for league, tournament, and competition video game playing initiated through an application from an application provider's server downloaded onto a video game player's computer system, and video game playing is implemented through a service provider's server system. The service provider places a player in a lobby and the player selects a game, contest, and platform using the player's computer system. Players are matched with players of similar skills based on skill measurements. Eliminated players are returned to the lobby for continuous play. Player identity is validated, and player cheating is detected. The service provider provides on the player's computer system accounting data, social media, a lobby, recent matches, and live matches. Winners are provided payouts. Eliminated players may have continuous play.

20 Claims, 7 Drawing Sheets

METHOD AND SYSTEM FOR COMPETITIVE VIDEO GAME PLAYING

CROSS-REFERENCE TO RELATED APPLICATIONS

This application claims the benefit of U.S. Non-provisional patent application Ser. No. 16/788,849, filed Feb. 12, 2020, which is incorporated herein by reference in its entirety.

FIELD OF THE INVENTION

This invention relates to systems and methods for managing computer video game competition and, more particularly, to a system and method for creating and managing professional league, tournament, and competitive video game playing that encompasses video game players at all skill levels.

BACKGROUND OF THE INVENTION

There are hundreds of millions of potential e-sports competitors looking for opportunities to join and play competitive video games. Many of these competitors play competitive video games as a way to make money and more are starting to view it as a viable career choice. Teams of players of select games are being created and sold and these video game players receive salaries plus a percent of what they earn through successful completion of tournaments. However, these players and teams encompass a tiny fraction of the video game playing market and they severely limit who is able to participate in interactive video gaming tournaments. The primary difference between professional sports and video games is the percent of people with sufficient skill necessary to compete on a professional level. With growing interest in virtual games, there is an exponentially larger number of people with the skill to compete in professional, interactive video gaming tournaments compared to the number of people that are qualified to participate in professional sports. However, there is currently no adequate system or method to incentivize, facilitate, and support extensive professional, interactive video gaming leagues and tournaments.

Video games which are accessible to multiple players via a server or peer to peer network are well known. For example, hundreds of millions of players access games known as massive multi-player online games. Players of these games customarily access a game repeatedly over a given period of time. The games are often constructed such that players pay a periodic subscription price or a onetime purchase price for the game. Often, though not necessarily, these games have no defined "winner" or "winning goal," but instead attempt to create an enjoyable playing environment and a strong player community.

In some current embodiments, interactive gaming tournaments with entrance fees and cash prizes based on skill rely on an event organizer to collect and distribute the entrance fees and prize pools by visually witnessing the outcome of matches. These games also allow players to experience a rising sense of excitement by providing them with goals and objectives within the game that give the gaming experience a greater feeling of purpose and meaning.

Video games are in the nascent stages of being recognized as a viable spectator sport. Current video game systems and social media-based methods for the development and distribution of video game content have not been adequate to provide skill-based player growth and monetization for video game players. The video gaming industry lacks the mechanics and the structure to develop professional, interactive video gaming leagues and tournaments. In any successful, long term traditional sport with a broad fan-base, there exist several key qualities. Fans and players are acquired through a structured set of leagues ranging from youth leagues to professional leagues. Skilled athletes have a well-defined path to making income. Game integrity is maintained through a governing body. Marketing athletic events is aimed at player recognition and improvement of player skills. These qualities do not exist in video game industry.

League-based play is critical for creating player popularity and providing a path for players to receive income. A lack of a well-defined path to player income reduces long-term player interest in playing and reduces the interest in fans watching the games. Social media marketed video game players are watched for their personalities and reputations rather than their skills and performance. Currently there is no adequate process to identify skilled players for eSports that encompasses the entire video player population. There is currently no effort to enable video games to operate like traditional professional athletic sports. Although there are 2.5 billion video game players world-wide, there is no effective global communication and interaction among these video game players. There is no financial incentive or satisfactory compensation for the majority of these video game players. There are unfair competitive advantages and lack of adequate security in current professional video game play. What is needed is a system and method for professional league, tournament, and competition video game playing that addresses these problems and deficiencies.

SUMMARY OF THE INVENTION

The present invention provides a method and system for league, tournament, and competition video game playing. A league, tournament, and competition video game playing application (application) is downloaded over a network onto a user's computer system that is associated with a user, from an application provider's server system that includes one or more processors and a memory. The application is initiated on the user's computer system by a processor in the user's computer system. The user, using the user's computer system, logs into and connects to a service provider's server system over the network and by one or more processors in the service provider's server, the quality and sufficiency of a connection of the user's computer system to the service provider's server system is evaluated. A user is placed in a lobby as a video game player through the service provider's server system. A video game and contest are selected, and the video game is played by the video game player on one or more video game playing devices over the network and through the service provider's server system. Video game scoring and progress of the video game player during video game playing are monitored and recorded over the network by the processor in the service provider's server system. The video game is ended and winnings are distributed to winners of the video game.

Video game options and contests for playing video games over the network are displayed through the service provider's server system on the user's computer system. The video game options are based on an account status of the user, network quality and sufficiency, and game availability. The identity of the video game player is verified through the service provider's server system and the video game player's game playing is invalidated if the video game player's identity is not verified. A video game baseline score or baseline progress measurement is obtained for each user for one or more games in one or more video game genres in order to match all users evenly in a video game and match.

Cheating by the video game player in a video game is detected by comparing baseline scores or baseline progress measurements of the video game player with scoring or progress of the video game player in the video game. The user's computer system may be paired with one or more video game playing devices and the user's computer system may be used for audio and visual communication during video game playing. Icons on a display of the user's computer system may be used by the user to access an account function, a social media network function, a lobby function, a recent matches function, and a live matches function, through the network and the service provider's server system.

A video game player may be entered into a video game in a video game set in a plurality of video game sets, wherein each video game set in the plurality of video game sets has a payout different from the other video game sets. A video game player eliminated from a video game may be returned into the lobby and the video game player may be entered into another video game. A video game player eliminated from a video game may be returned into the lobby and may be entered into another video game in a different video game set, the different game set having a higher payout than the video game set from which the video game player was eliminated.

When not playing a video game a user can use icons on a display of the computer system to access an account function, a social media network function, a lobby function, a recent matches function, and a live matches function, through the network and the service provider's server system.

A system for implementing league, tournament, and competition video game playing includes an application provider's server system that includes one or more processors, a memory, and a league, tournament, and competition video game playing application in the memory. The one or more processors are programmed to receive a request from a user's computer system to download the application over a network to the user's computer system, into a memory of the user's computer system. The memory of the user's computer system includes instructions that when executed cause one or more processors in the user's computer system to initiate the application on the user's computer system and connects the user's computer system to the service provider's server over the network, whereby the service provider's server, through the application implements the method of this invention.

An advantage of the present invention is a method and system that provides social media-based methods for the development and distribution of video game content to provide skill-based video game player growth and monetization for video game players.

Another advantage is video game integrity being maintained through a governing body.

Another advantage is a method and system that can market video gaming events aimed at player recognition and improvement of player skills.

Another advantage is method and system that provides a well-defined path to video game player income.

Another advantage is process to identify skilled players for eSports that encompasses the entire video game player population.

Another advantage is a method and system that provides effective global communication and interaction among video game players.

Another advantage is a method and system that eliminates unfair competitive advantages and provides adequate security in professional video game play.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
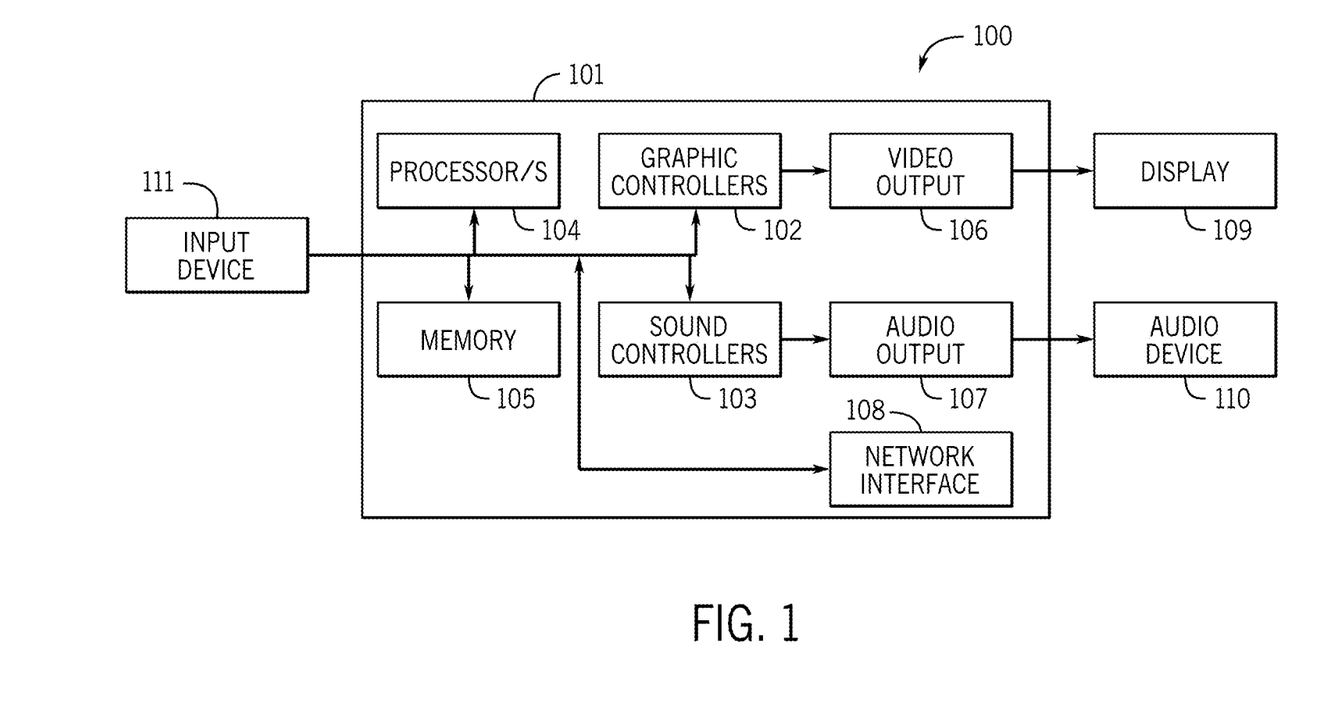
FIG. 1 provides a schematic block diagram of a user computer system for implementing this invention.
Figure 2:
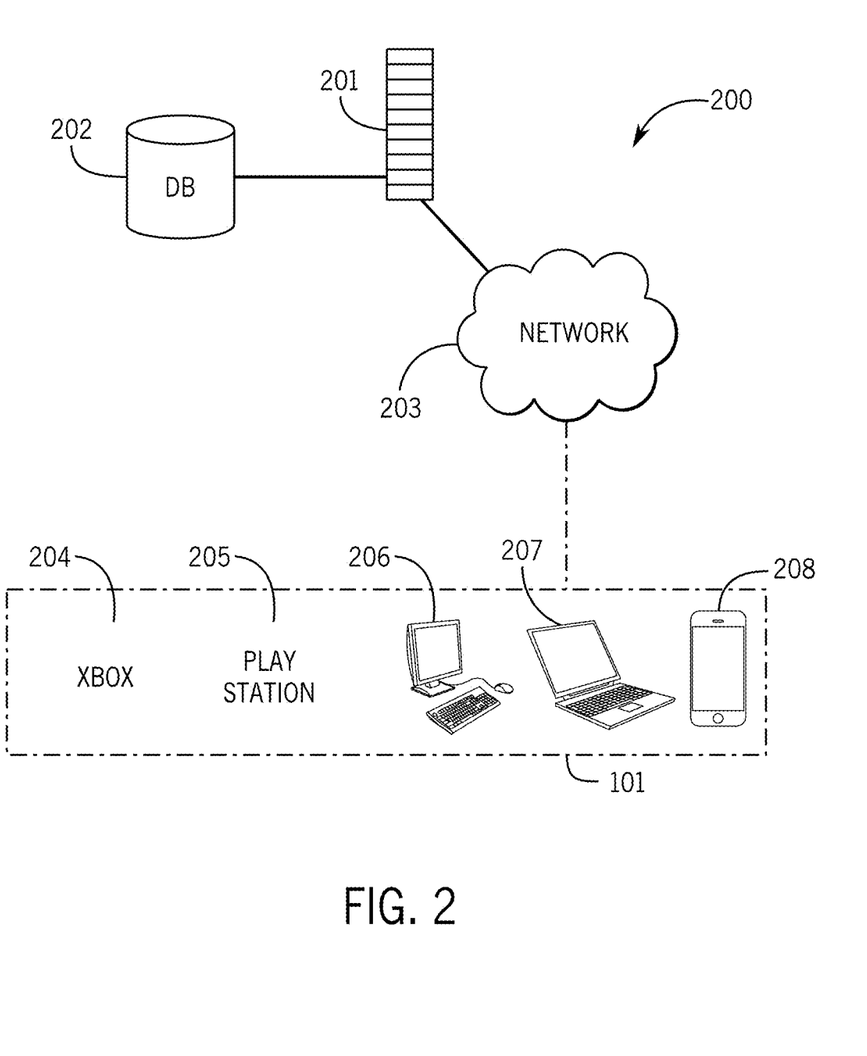
FIG. 2 shows block diagram of a service provider's network server system for implementing this invention for competitive video game playing.

Some of the factors that motivate video game players to play video games include winning, financial gain, being fairly challenged by another player, and improving video game playing skills. This invention provides a system, method, and computer program product for professional league, tournament, and competition video game playing that provide these motivations to video game players and provide video game players at all skill levels the opportunity to play professionally. This invention can be implemented in a computer system and network system as shown in FIGS. 1 and 2 as non-transitory computer-readable media which comprise all computer-readable media except for a transitory, propagating signal. FIG. 1 provides a schematic block diagram of a user system 100 for implementing this invention. All of the blocks shown are implemented by suitable circuitry and may be implemented in hardware and/or software. The user system 100 has a computer system 101 having a graphics controller 102 and a sound controller 103. The graphics controller 102 and sound controller 103 are provided by the one or more processors 104 and memory 105. The graphics controller 102 is configured to provide a video output 106. The sound controller 103 is configured to provide an audio output 106. The computer system 101 has a network interface 108 allowing the computer system 101 to be able to communicate with a network such as the Internet or other communication infrastructure. The video output 106 is provided to a display 109. The audio output 107 is provided to an audio device 110 such as a speaker and/or earphone. The user device 100 has an input device 111 which can take any suitable format and can be one or more keyboards, audio input, mouse, touch screen, joystick or game controller. The user device 100 is shown by way of example only. In alternative embodiments, one or more of the parts may be omitted. Alternatively, or additionally, some embodiments may comprise one or more other parts. Alternatively, or additionally, one or more parts may be combined.

FIG. 2 shows block diagram of a service provider's network server system 200 for implementing this invention for matching video game players and for providing video game playing. The service provider's network server system 200 has a server 201 which may provide storage or be in communication with database 202. The server 201 may have all the features shown in FIG. 1, including computer games, learning programs, accounting programs, and data storage and comprise one or more units of memory to store video game results and accounting data. The server 201 may have one or more processors to implement and monitor video games, to evaluate, identify, and match video game players, and to run video game related programs, applications, and learning programs. The server 201 may communicate via a communications infrastructure 203 to one or more user computer systems 101, shown as Xbox 204, play station 205, computer 206, tablet 207 and smartphone 208. The communications infrastructure 203 may be the Internet or the like. A user downloads an application to interface with the service provider's network server system 200. The application may be obtained from an application provider 209 which may also be the service provider's network server system 200.

Figure 3:
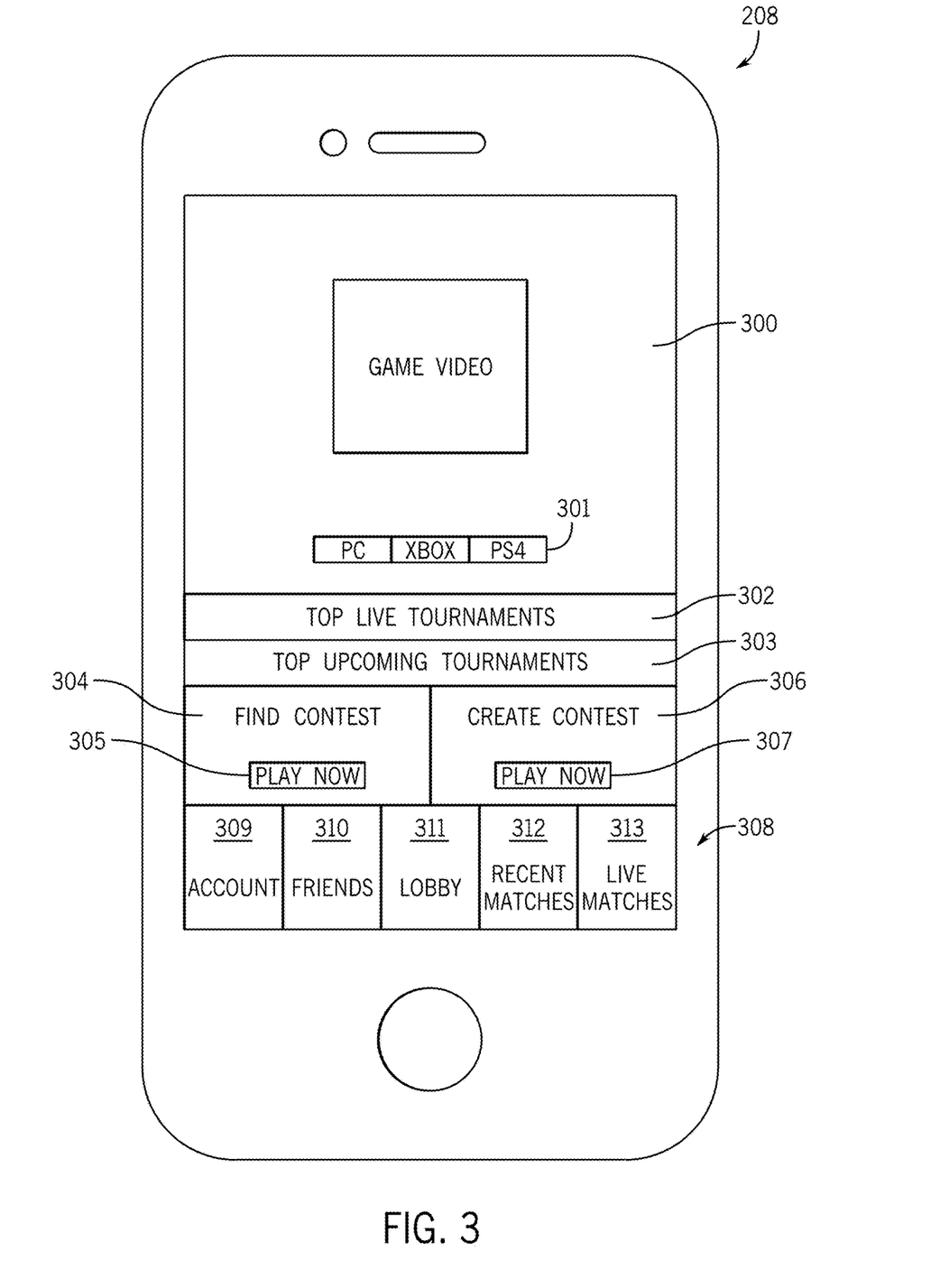
FIG. 3 shows an example of a computer system, such as a smartphone, with a standard home page and lobby menu on the display screen, generated by the application provider's application for competitive video game playing.

FIG. 3 shows an example of a user's computer system 101, such as a smartphone 208, with a standard home page and lobby menu on the display screen 300. A smartphone is a handheld personal computer having features like those shown in FIG. 1. A smartphone possesses extensive computing capabilities, including high-speed access to the Internet using both Wi-Fi and mobile broadband. Most, if not all, smartphones are also built with support for Bluetooth wireless transmission and satellite navigation (GPS). Modern smartphones have a touchscreen color display 300 with a graphical user interface that covers the front surface and enables a user to use a virtual keyboard to type and press onscreen icons. Interaction is mostly done using touch, besides a few physical buttons. Smartphones function using a rechargeable lithium-ion or lithium-polymer battery. Smartphones use a mobile operating system and can process a variety of software components, known as applications or "apps". Most basic apps (e.g. event calendar, camera, web browser) come pre-installed with the system, while others are available for download. Apps, and the operating system in the smartphone, can receive additional functionality through updates.

The user's computer system 101 is used by the user to download a league, tournament, and competition video game playing application (the application) from an application provider's network server system 209. A login display is shown on the user's computer system 101 after downloading the application. After logging into the application provider's network server system 209 the standard home page and lobby menu is shown on the user's computer system 101, as shown in FIG. 3. The user's computer system 101 can be paired with game playing devices (platforms) 204, 205, 206, 207 and 208 and serve as a remote controller for video game playing provided by the service provider's network server system 200 and for the devices. Access button 301 is used for selecting the platforms, access button 302 is used for selecting live video game tournaments 302, and access button 302 is used for selecting upcoming video game tournaments 303 through the downloaded application. A user (game player) can select and find a video game contest 304 and play 305 or select creating a video game contest 306 and play 307. At the bottom end of the smartphone 300 there may be a display of access tabs or icons 308 for accessing various functions such as, for example, accounting 309, friends (social media networks), 310, lobby 311, recent matches 312, and live matches 313.

The top live tournaments 302 option shows major tournaments and events for the day, allowing the user to watch the gamer of their choice or a friend playing a video game in a match. The top live tournaments 302 option also gives users the chance to scout and recruit other video game players to join their teams or squads in other events and tournaments. Similarly, upcoming video game tournaments 303 can be reviewed for registration.

In order to participate in a video game, the user downloads the application and choses a platform and a video game displayed on the user's computer system. A smartphone itself can be used as a platform. Each video game will have unique contests and tournaments. For Example, a shooter would not have the same contest and events as a sports video game because each video game is formatted differently. After selecting a video game and contest 304 the user selects the play now option 305. Selecting this option shows the user's friends that the user is ready to play cooperatively in a contest as well as showing with whom the user has recently interacted. This option gives the user and his or her friends a chance to join a contest of their choice together. After the video game is played, depending on where the user places in the video game contest, the user is compensated for the user's participation in the video game contest and receives earnings or winnings (payout) into the user's account. After the user receives his or her payout or if the user lost his or her event, the user remains able to play any match of his or her choosing, depending on how much money is in the user's account.

Using the Account tab 309 the user has access to his or her avatar and profile and can add or withdraw money, obtain financial transaction history, refer friends, access rewards, and adjust his or her notification settings. The user can get an adjusted balance on his or her profits or money total as well as access points and vouchers received for entering tournaments.

Using the Friends tab 310 a social media function is provided to the user. The user will be able to connect, chat, live stream, and share with friends, including live streaming.

Using the Lobby tab 311 provides the user an easy access to enter a game. The user selects a desired platform, selects a desired game, and then selects a desired game structure or contest.

Using the Recent Matches tab 312 shows the user the recent matches in which the user has participated as well as what platform the user used. The user can watch a video of any match in which the user participated. This feature provides the user the ability to view their performance on video, to edit the video, and to share the video with friends through the social media Friends 310 function.

Using the Live Matches tab 313 allows the user to view and stream the major video game events for the current day. Each day may have a major daily tournament or event for each game and platform. Providing viewing of daily video games to video game players is expected to give them confidence to participate in video game competition. There are many video game players who have not participated in video game competition because of a lack of confidence in their video game playing abilities. Watching other video game players and friends participate in the video game competition is expected to improve their video game playing ability and give them the confidence to compete in competitive, challenging, professional video game matches and tournaments.

Figure 4:
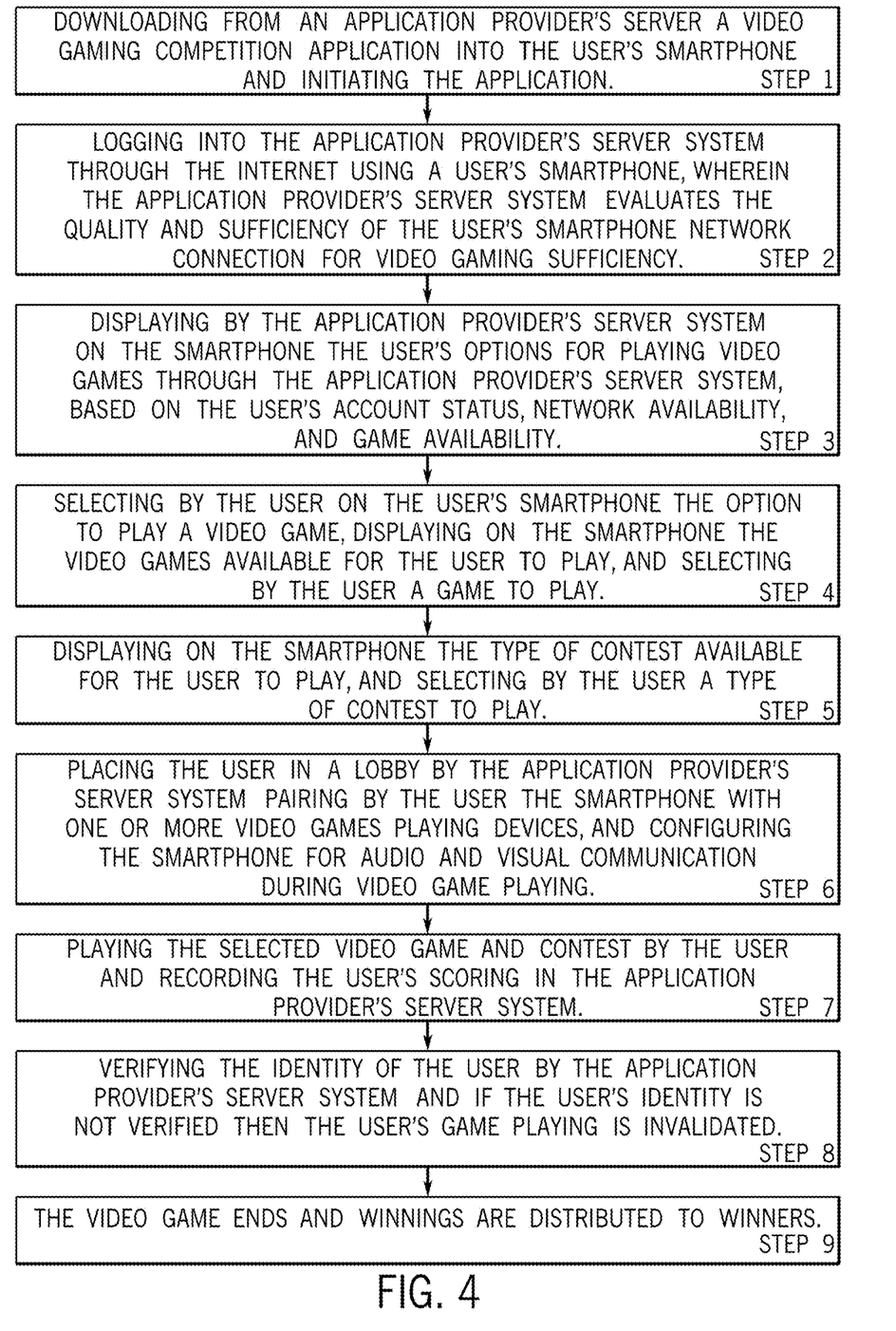
FIG. 4 is a flow diagram of the method for professional league, tournament, and competition video game playing of this invention.

FIG. 4 is a flow diagram of the method for professional league, tournament, and competition video game playing of this invention. A user initiates a video gaming competition application on the user's computer system which the user downloaded from an application provider's server onto the user's computer system (Step 1). The user logs into the service provider's server system through the internet and the quality and sufficiency of the user's network connection to the service provider's server is evaluated for video gaming sufficiency (Step 2). The user's options for playing video games through the service provider's server, based on the user's account status, network availability, and game availability are displayed to the user (Step 3).

Video game players that utilize an online gaming platform can gain status among a gaming community. Video game players that achieve specific goals in a video game may be awarded items that can be used by the player in that game, in other games, and/or in other services offered by the platform. These items may inform other players of that player's accomplishments on the platform. The achievement of such goals, in combination with high scores in games played on the platform, amount of time spent playing games on the platform, etc, may contribute toward a ranking of the player relative to other players on the platform. Such achievements and rankings can motivate players on the platform to continue to use the platform and improve game play over time. The probability of achieving these goals is achieved if the video game players are evenly and fairly matched.

Video game players can be properly matched if their game playing skills have been measured and quantitated. Video game skills have been measured using machine learning methods. The relationship between video game genres and video game skills has been described (Santos et al, "Relationship between video game genres and soft skills; https://gecon.es/game-genres-and-soft-skills/; 2018, incorporated herein by reference). The video game skills are of four types: cognitive and physical, basic, cross-functional and emotional. Cognitive and physical include the following skills: cognitive flexibility, creativity, logical reasoning, induction, speed of reasoning, problem sensitivity, visualization, spatial relations, and spatial scanning. Basic skills include communication, and monitoring self and monitoring others. Cross-functional skills include complex problem solving; people and team management; time management, judgement and decision making, and coordinating with others. Emotional skills include stress management, frustration tolerance, self-discipline, self-motivation, organizational skills, self-confidence, and goal setting. Video games are generally classified in the following video game genres: adventure, racing, platform, puzzle, racing, role playing, simulation, sports, strategy, and survival. In this invention a video game player's game playing skill may be adequately estimated for any specific video game genre by obtaining the player's score or average score from playing one or more video games in the specific video game genre (baseline score). An estimate of a video game player's overall video game playing skill baseline score can also be estimated from an average of scores obtained from a plurality of video games from a plurality of video game genres. A video game player's game playing skill can also be estimated using a machine learning program, such as, for example, described by LIU et al, U.S. Patent Application No. 2018/0182208, incorporated herein by reference. Liu et al measure a user's progress in a game which reflects the user's video game playing skills and can provide a video game playing progress baseline score. If a user, using a smartphone 208 selects play 307 for the first time, the user can be requested to select a video game in a specific genre and to play the video game in a match to obtain an estimate or measure of the video game player's game playing skills. The user can repeat this process as desired to obtain an overall measure of game playing skills in a plurality of video game genres.

When the user selects the option to play a video game the video games available for play are presented to the user and the user picks a video game (Step 4). The user's options for type of contest are presented to the user, such as solo match, duo match, or squad match and the user selects a contest (Step 5). A user can be an individual, a duo, or a squad. The user is placed in a lobby, pairs the user's computer system with one or more video game playing devices which include personal computers, Xboxes, PlayStations, iPads, or televisions, and uses the user's computer system for audio and visual communication during video game playing (Step 6). The smartphone 208 may also be used as a video game playing device. The user plays the selected video game and contest, scoring is monitored and recorded by the service provider's server, and the player's score is compared to his respective video game baseline score. (Step 7). User identification is further verified based on the results of machine learning monitoring. If the user's progress in a game is classified as abnormal based on machine learning monitoring, as described by LIU et al, then the user's game playing results may be invalidated (Step 8). The video game ends and winnings are distributed to winners (Step 9). For example, in a Royale Solo game with 100 players, with each player paying $1.00 to enter the video game, the following payout is made: first place $30.00, second place $17.50, third place $10.00, 4th place $5.00, 5th and 6th place $3.75, 7th-10th place $2.50, 11th-16th place $2.00, and 17th-20th place $1.50. The remaining $2.00 is paid as profit to the host of the video game contest. Players below 20th place may be automatically looped back to the lobby to play another game, as described below.

Video game playing skills can range from poor to average, to good, and to exceptional. These game skills can be measured as described above and can be used to place video game players into video game leagues, tournaments, and games that evenly match their skills with those of opposing players to ensure fair competition. Video games with a level of difficulty comparable to the skill level of the video game players can be also be provided. When video game players are evenly matched in this way, and the video games are evenly and fairly matched to the player skills, the satisfaction and pleasure of the players video game playing are maximized, and they are motivated to continue their video game playing. Based on a video game player's measurement of skills, video games can be selected to train and coach the player to improve his or her video game skills.

Figure 5:
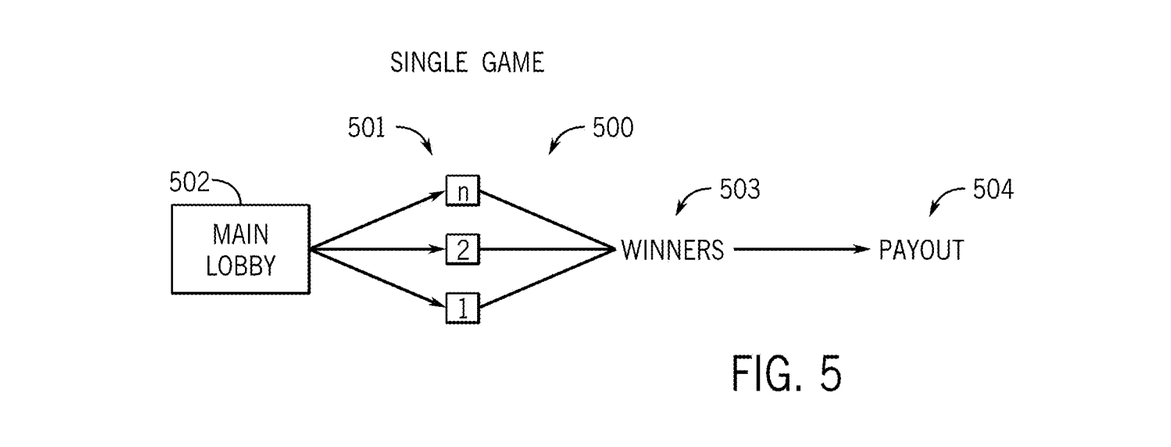
FIG. 5 shows a flow chart of a single video game play design having a plurality of video games in a video game set.

Various types of video games known in the art are provided to the video game player, for example, Dota, Starcraft, Counterstrike, Warcraft, Crossfire, FIFI, Fortnite, game styles to maintain video game player interest and enthusiasm. FIGS. 5-10 show various flows of game play of varying degrees of complexity. FIG. 5 shows a flow chart of a single video game play design (contest) 500 with game set 501, having two or more video games 1 through n wherein the video games are identical The video games are different from each other in that the payout incentives for playing are different for each game. The payout incentives are greater in each video game in an ascending order from 1 through n. After a video game player has downloaded the video gaming competition application, from the application provider's server, onto the user's computer system, a main lobby 502 appears on the display of the computer system providing a choice of video games for play. When the user selects a video game and contest, the video game is displayed on the user's video game playing device and the user is assigned by the service provider's network server system, preferably randomly, to one of the video games. The user's computer system then automatically functions as an audio-visual device so that the user can communicate with others during game play, for example, with the video game player against whom the user is playing, i.e., another user also from the same video game as the user's video game. There may be many users in each video game and many video games in each a video game set. At the end of each video game the winners 503 are identified and receive a payout 504.

Figure 6:
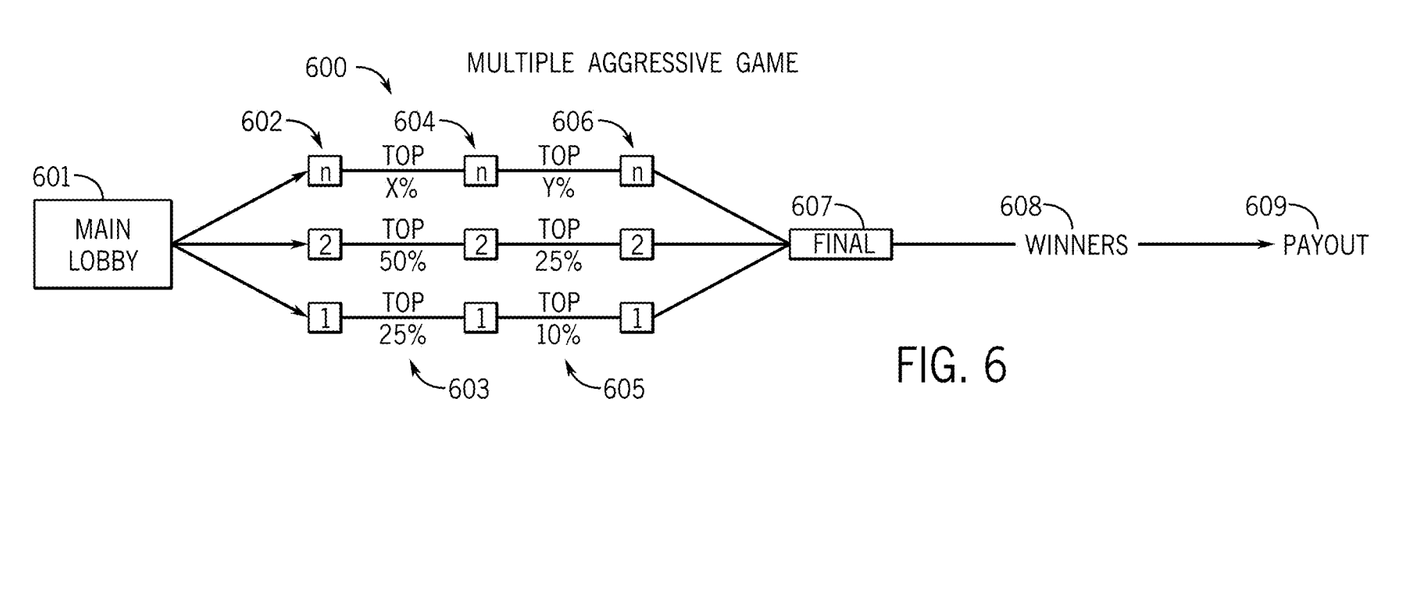
FIG. 6 shows a flow chart of multiple aggressive video game play design having two or more video game sets.

FIG. 6 shows a flow chart of multiple aggressive video game play design 600. The user selects a game from a main lobby 601, enters into one of 1 through n video games in the video game set 602, and initiates video game play with an opposing video game player on the user's video game playing device. A percentage 603 of top scoring video game players advance into another game set 604 and play a new video game. The remaining players are eliminated from play. A percentage 605 of top scoring video game players advance into another video game set 606 and play a new video game. The winners in each video game 1 through n will play a final video game 607. Winners 608 in the final video game 607 will receive a payout 609. In this video game design video game players have a chance to compete in multiple games. Although only three video game sets 602, 604, and 606 are shown, as many video games sets as desired may be used.

Figure 7:
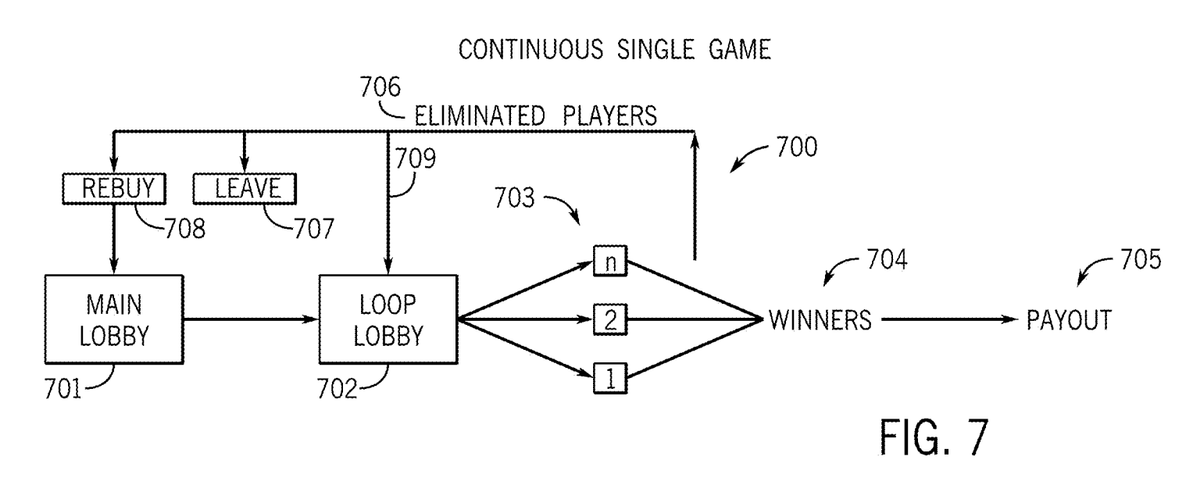
FIG. 7 shows a flow chart of a continuous single video game play design based on the single video game play design of FIG. 5.

FIG. 7 shows a flow chart of a continuous single video game play design 700 based on the single video game play design of FIG. 5. The user selects a video game from a main lobby 701 and is presented with a loop lobby 702 wherein the user will be placed into one set 703 of video games 1 through n. Winners 704 in each video game will receive a payout 705. Eliminated video game players 706 will be able to choose leaving game play 707, rebuying 708 and entering the main lobby 701, or being looped back 709 to the loop lobby 702 to be automatically entered into the same video game, into which the video game player was first placed, to play another video game. Eliminated video game players 706 can cycle or loop through the loop lobby 702 continuously or until video game play is ended by the service provider's network server system.

Figure 8:
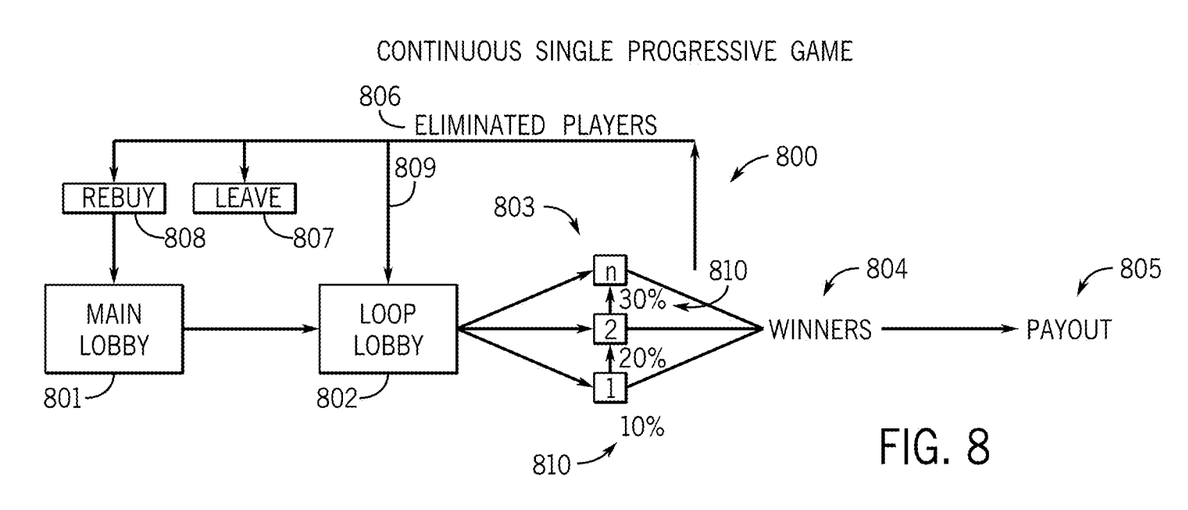
FIG. 8 shows a flow chart of a continuous multiple progressive video game play design based on the continuous single video game play design of FIG. 7.

FIG. 8 shows a flow chart of a continuous multiple progressive video game play design 800 based on the continuous single video game play design of FIG. 7. The user selects a video game from a main lobby 801 and is presented with a loop lobby 802 wherein the user will be placed into one video game of a set 803 of video games 1 through n. Winners 804 in each video game will receive a payout 805. Eliminated players 806 will be able to choose leaving game play 807, rebuying 808 and entering the main lobby 801, or being looped back 809 to the loop lobby 802 to be automatically entered into the same video game, into which the player was first placed, to play another video game. However, a percentage 810 of the eliminated players in each video game will be placed in a next higher video game (greater payout incentive), based on the player's video game performance in the player's previous video game. Eliminated players 806 can cycle or loop through the loop lobby 802 continuously or until video game play is ended by the service provider's network server system.

Figure 9:
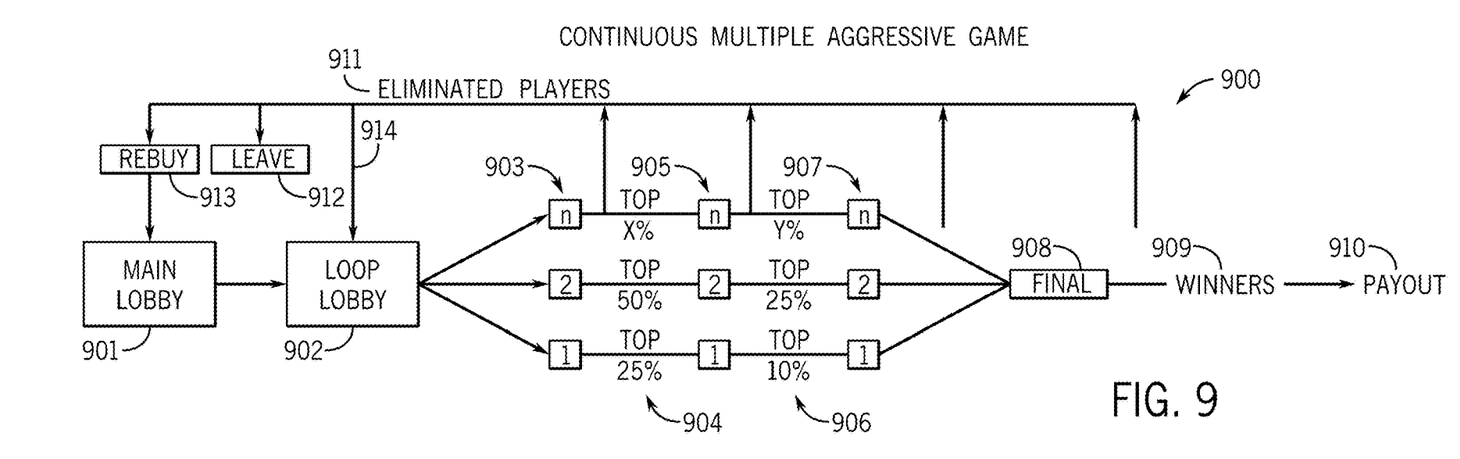
FIG. 9 shows a flow chart of a continuous multiple aggressive video game play design based on the multiple aggressive video game play design of FIG. 6.

FIG. 9 shows a flow chart of a continuous multiple aggressive video game play design 900 based on the multiple aggressive video game play design of FIG. 6. The user selects a video game from a main lobby 901 and is presented with a loop lobby 902 wherein the user will be placed into one video game in a set 903 of video games 1 through n game sets 903. The user initiates play with an opposing video game player on the user's game playing device. A percentage 904 of top scoring video game players advance into another video game set 905 and play a new video game. The remaining players are eliminated from video game play. A percentage 906 of top scoring video game players advance into another video game sets 907 and play a new video game. The winners in each video game set 907 will play a final video game 908. Winners 909 in the final video game 908 will receive a payout 910. Eliminated players 911 will be able to choose leaving video game play 912, rebuying 913, and entering the main lobby 901, or being looped back 914 to the loop lobby 902 to be automatically entered into the same video game, into which the player was first placed, to play another video game. Eliminated players 911 can cycle or loop through the loop lobby 902 continuously or until video game play is ended by the service provider's network server system.

Figure 10:
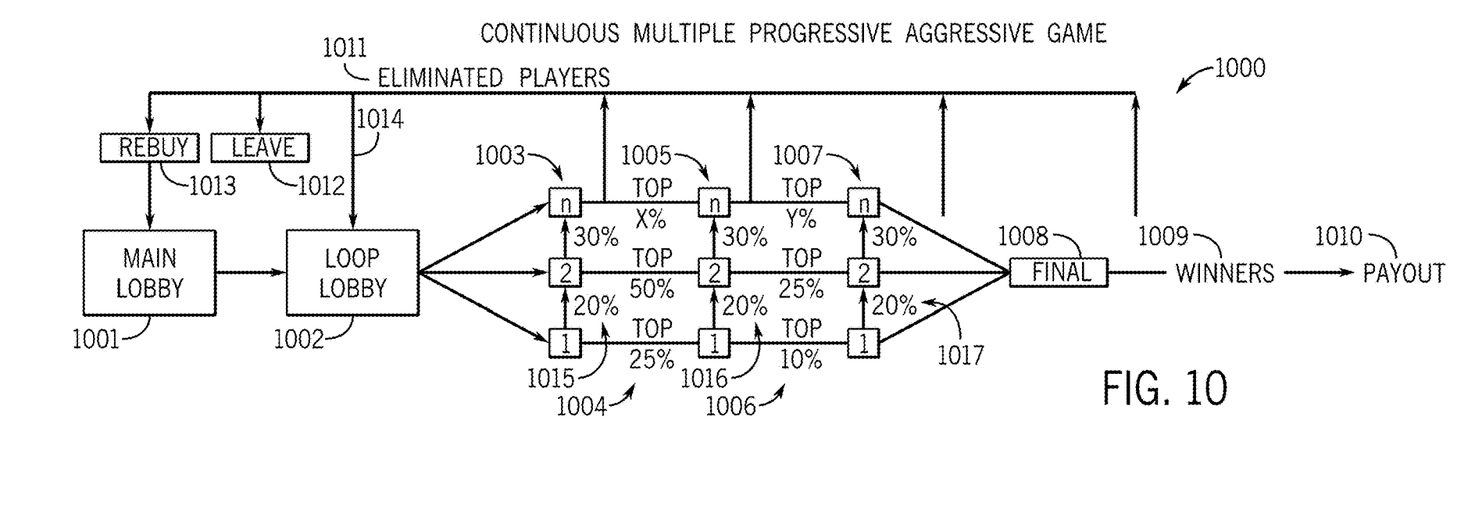
FIG. 10 shows a flow chart of a continuous multiple progressive aggressive video game play design based on the continuous multiple progressive video game play design of the continuous multiple aggressive video game play design of FIG. 9.

FIG. 10 shows a flow chart of a continuous multiple progressive aggressive video game play design 1000 based on the continuous multiple progressive video game design of FIG. 9. The user selects a video game from a main lobby 1001 and is presented with a loop lobby 1002 wherein the user will be placed into one video game in video game set 1003. The user initiates play with an opposing video game player on the user's game playing device. A percentage 1004 of top scoring video game players advance into another video game set 1005 and play a new video game. The remaining players are eliminated from play. A percentage 1006 of top scoring video game players advance into another video game set 1007 and play a new video game. The winners in each video game will play a final video game 1008. Winners 1009 in the final video game 1008 will receive a payout 1010. Eliminated players 1011 will be able to choose leaving video game play 1012, rebuying 1013 and entering the main lobby 1001, or being looped back 1014 to the loop lobby 1002 to be automatically entered into the same video game, into which the player was first placed, to play another video game. However, a percentage 1015, 1016, 1017 of the eliminated players in each video game will be placed in a next higher game (greater payout incentive), based on the player's video game performance in the player's previous video game. Eliminated players 1011 can cycle or loop through the loop lobby 1002 continuously or until video game play is ended by the service provider's network server system.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A computer implemented method for competition video game playing, comprising:
   1) connecting by a user to a service provider's server system over a network using the user's computer system;
   2) buying by the user from the service provider placement of the user into a competition video game of the service provider on the user's computer system;
   3) measuring by the service provider a baseline score of the user's video game playing skill;
   4) placing the user in a lobby as a video game player through the service provider's server system and providing to the user by the service provider video games and video game play designs that evenly match the user's baseline score of the user's video game playing skills with those of opposing players and thereby ensuring fair video game playing competition for the user;
   5) selecting a video game and a video game play design by the user and playing the video game by the user on one or more video game playing devices over the network;
   6) verifying the identity of the user through the service provider's server system; and
   7) providing payout by the service provider to winners of the video game.

2. The computer implemented method of claim 1 wherein the identity of the user is verified by comparing the baseline score of the user with scoring of the user while playing the video game.

3. The computer implemented method of claim 1 wherein the identity of the user in the video game is verified using machine learning programs by detecting the user's progress while the user plays the video game.

4. The computer implemented method of claim 1 wherein cheating by the user is detected by comparing the baseline score of the user with scoring of the user while the user plays the video game.

5. The computer implemented method of claim 1 wherein cheating by the user in the video game is detected using machine learning techniques while the user plays the video game.

6. The computer implemented method of claim 1, wherein a user eliminated from a video game by the service provider prebuys and is returned to a loop lobby and is entered into a video game having a higher payout incentive than the video game from which the user was eliminated.

7. The computer implemented method of claim 1 wherein video game play designs include a single video game design, a continuous multiple video game design, a multiple aggressive video game design, a continuous multiple progressive video game design, a continuous multiple aggressive video game design, and a continuous multiple progressive aggressive video game design.

8. The computer implemented method of claim 7 wherein a single video game design has one set of video games, a multiple aggressive video game design has two or more sets of video games, a continuous video game design has a loop lobby, and a progressive video game design advances a video game player in a video game in a given set of video games to another video game within the given set of video games.

9. The computer implemented method of claim 8 wherein a video game in a given set of video games is identical to all the other video games in the given set of video games.

10. The computer implemented method of claim 8 wherein a video game in a given set of video games has a higher payout incentive compared to other video games in the given set of video games.

11. A computer implemented method for competition video game playing, comprising:
    1) connecting by a user to a service-provider's server system over a network using the user's computer system;
    2) buying by the user from the service provider placement of the user into a competition video game of the service provider on the user's computer system;
    3) measuring by the service provider a baseline score of the user's video game playing skill;
    4) placing the user in a lobby as a video game player through the service provider's server system and providing to the user by the service provider video games and video game play designs that evenly match the user's baseline score of the user's video game playing skills with those of opposing players and thereby ensuring fair video game playing competition for the user;
    5) selecting a video game and a video game play design by the user and playing the video game by the user on one or more video game playing devices over the network;
    6) detecting the identity of the user through the service provider's server system; and
    7) providing payout by the service provider to winners of the video game,
    wherein a user eliminated from a video game by the service provider rebuys and is returned to a loop lobby and is entered into a video game having a higher payout incentive than the video game from which the user was eliminated, wherein video game play designs include a single video game design, a continuous multiple video game design, a multiple aggressive video game design, a continuous multiple progressive video game design, a continuous multiple aggressive video game design, and a continuous multiple progressive aggressive video game design, and wherein a single video game design has one set of video games, a multiple aggressive video game design has two or more sets of video games, a continuous video game design has a loop lobby, and a progressive video game design advances a video game player in a video game in a given set of video games to another video game within the given set of video games.

12. The computer implemented method of claim 11 wherein the identity of the user is verified by comparing the baseline score of the user with scoring of the user while the user plays the video game and by detecting the user's progress using machine learning programs while the user plays the video game.

13. The computer implemented method of claim 11 wherein cheating by the user is detected by comparing the baseline score of the user with scoring of the user while the user plays the video game and by detecting the user's cheating using machine learning techniques while the user plays the video game.

14. The computer implemented method of claim 11 wherein a video game in a given set of video games is identical to all the other video games in the given set of video games and wherein a video game in a given set of video games has a higher payout incentive compared to other video games in the given set of video games.

15. A computer implemented method for competition video game playing, comprising:
   1) connecting by a user to a service-provider's server system over a network using the user's computer system;
   2) measuring by the service provider a baseline score of the user's video game playing skill;
   3) placing the user in a lobby as a video game player through the service provider's server system and providing to the user by the service provider video games and video game play designs that evenly match the user's baseline score of the user's video game playing skills with those of opposing players and thereby ensuring fair video game playing competition for the user;
   4) selecting a video game and a video game play design by the user and playing the video game by the user on one or more video game playing devices over the network; and
   5) verifying the identity of the user through the service provider's server system.

16. The computer implemented method of claim 15 wherein the identity of the user is verified by comparing the baseline score of the user with scoring of the user while the user plays the video game and by detecting the user's progress using machine learning programs while the user plays the video game.

17. The computer implemented method of claim 15 wherein cheating by the user is detected by comparing the baseline score of the user with scoring of the user while the user plays the video game and by detecting the user's cheating using machine learning techniques while the user plays the video game.

18. The computer implemented method of claim 15 wherein a video game in a given set of video games is identical to all the other video games in the given set of video games and wherein a video game in a given set of video games has a higher payout incentive compared to other video games in the given set of video games.

19. The computer implemented method of claim 15 wherein a user eliminated from a video game by the service provider is returned to a loop lobby and is entered into a video game having a higher payout incentive than the video game from which the user was eliminated.

20. The computer implemented method of claim 15 wherein video game play designs include a single video game design, a continuous multiple video game design, a multiple aggressive video game design, a continuous multiple progressive video game design, a continuous multiple aggressive video game design, and a continuous multiple progressive aggressive video game design and wherein a single video game design has one set of video games, a multiple aggressive video game design has two or more sets of video games, a continuous video game design has a loop lobby, and a progressive video game design advances a video game player in a video game in a given set of video games to another video game within the given set of video games.

* * * * *